(12) United States Patent  
Dong

(10) Patent No.: US 8,689,824 B2
(45) Date of Patent: Apr. 8, 2014

(54) DISC CHECK VALVE CONSTRUCTION

(75) Inventor: Zhenxing Dong, Brighton, MA (US)

(73) Assignee: IDEX Health & Science, LLC, Middleboro, MA (US)

( * ) Notice: Subject to any disclaimer, the term of this patent is extended or adjusted under 35 U.S.C. 154(b) by 178 days.

(21) Appl. No.: 13/065,326

(22) Filed: Mar. 21, 2011

(65) Prior Publication Data

US 2012/0241030 A1 Sep. 27, 2012

(51) Int. Cl.
*F16K 15/02* (2006.01)
(52) U.S. Cl.
USPC .................. 137/528; 137/535; 137/512.1
(58) Field of Classification Search
USPC .......... 137/528, 535, 540, 543.21, 613, 512.1
See application file for complete search history.

(56) References Cited

U.S. PATENT DOCUMENTS

| | | | | |
|---|---|---|---|---|
| 122,756 | A * | 1/1872 | Camerer | 137/540 |
| 3,672,396 | A * | 6/1972 | Pauliukonis | 137/512 |
| 4,197,857 | A | 4/1980 | Osborn | |
| 4,832,075 | A | 5/1989 | Dubach | |
| 5,002,662 | A | 3/1991 | Ledtje et al. | |
| 6,105,610 | A | 8/2000 | Watkins, II et al. | |
| 6,390,120 | B1 | 5/2002 | Guala | |
| 6,536,467 | B2 | 3/2003 | Wu et al. | |
| 6,651,693 | B2 | 11/2003 | Simmons et al. | |
| 6,892,758 | B2 | 5/2005 | Inage et al. | |
| 6,899,127 | B1 | 5/2005 | Swingley | |
| 7,311,118 | B2 | 12/2007 | Doutt | |
| 2002/0096217 | A1 | 7/2002 | Wu et al. | |
| 2004/0159355 | A1* | 8/2004 | Vasilev | 137/528 |
| 2009/0104083 | A1 | 4/2009 | Aso | |
| 2009/0301577 | A1 | 12/2009 | Carter, III et al. | |
| 2009/0320939 | A1 | 12/2009 | Loos | |
| 2010/0011578 | A1 | 1/2010 | Beck et al. | |
| 2010/0032027 | A1 | 2/2010 | Matsubara et al. | |

* cited by examiner

*Primary Examiner* — Kevin Lee
*Assistant Examiner* — Macade Brown
(74) *Attorney, Agent, or Firm* — Vinson & Elkins LLP

(57) ABSTRACT

A check valve construction is provided having: a movable disc with a flat surface on a first side and a convex shaped surface on the opposing side, a first seat on for the flat surface and a second seat for the convex surface, where the narrowest portion of the fluid path is defined by the equation:

$$G^3 = \frac{12\mu W Q}{\pi D \Delta P}$$

Wherein
G: the gap of most narrow passageway between the flat surface of the disc and disc seat;
μ: dynamic viscosity of the fluid;
D: mean diameter of the flat sealing surface of the disc;
Q: desired fluid flow rate;
W: breadth of the flat sealing surface of the disc;
ΔP: pressure differential across the gap (G).

8 Claims, 5 Drawing Sheets

DISC CHECK VALVE CONSTRUCTION

BACKGROUND OF THE INVENTION

This invention relates to a disc check valve construction for a fluid delivery system useful for dispensing precise volumes of fluid.

Prior to the present invention, fluid delivery systems have been available which minimize system volume and which minimize intermixing of fluids while delivering a precise amount of a fluid for use such as in a chemical reaction. These systems generally are utilized for chemical processes such as diagnosis or analytical apparatus or for processes that involve a large number of sequentially effected chemical reactions such as in protein synthesis, deoxyribonucleic acid (DNA) synthesis or when sequencing proteins.

Check valves that permit fluid flow in only one direction are commonly utilized in fluid delivery systems to effect delivery of discrete fluid volumes sequentially from a fluid reservoir to a point of use. When utilizing such fluid delivery systems, it is desirable to minimize conditions, which may result in variation in volume of the discrete fluid samples being delivered. In order to minimize such volume variations, it is desirable that the check valve have a quick response to changes in pressure, a large hydraulic force applied to the movable portion of the check valve such as a ball, and that the movable portion does not chatter or slam when moved. In addition, it is desirable that the check valve have a low internal volume for high performance fluid delivery systems.

Accordingly, it would be desirable to provide a check valve and a fluid delivery system which utilizes a check valve construction which reduces back pressure within the valve thereby reducing the pressure needed to move the movable portion of the valve and to provide a quick response time for opening or closing the valve.

SUMMARY OF THE INVENTION

In accordance with this invention, a check valve construction and system utilizing the valve are provided. The check valve construction has two independent movable disc elements each of which functions to open or close a fluid passageway. The movable disc elements fit within the disc chamber containing a spring device that serves to move and center the disc within the chamber. The disc of the check valve includes a convex surface that intersects with a flat surface as well as a raised element positioned on the convex surface. The raised element is confined by the spring and serves to position the disc within the disc chamber and to contact the spring to control disc movement within the disc chamber. When the valve is open, the disc is moved away from a flat seat thereby forming gaps that permit fluid flow within close proximity of the surface intersections. The gaps are sized both to permit fluid flow around the movable disc element and to reduce back pressure on the flat surface of the movable disc element. This reduced back pressure permits the movable disc element to be moved more quickly between the open position and the closed position for a given pressure on the disc element.

DESCRIPTION OF SPECIFIC EMBODIMENTS

Figure 1:
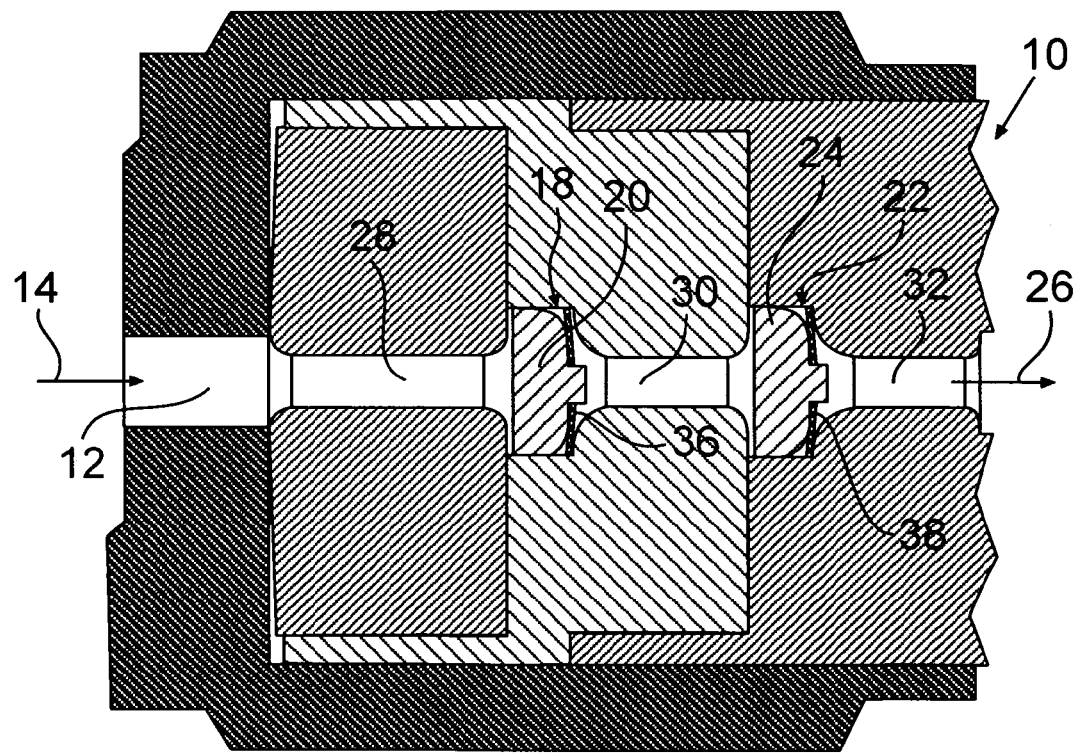
FIG. 1 is a cross sectional view of a fluid delivery system in a fluid delivery position when the disc valves of this invention are open.

Referring to FIG. 1, a fluid delivery system that utilizes the disc check valve construction of this invention is shown in fluid delivery position. The fluid delivery system 10 includes a pump (not shown), downstream of fluid passageway 12. The direction of movement of the fluid is shown by arrow 14. With this fluid movement, valve 18 having disc 20 and valve 22 having disc 24 are open. When the pump is activated cylinders 28, 30 and 32 are filled with fluid from a fluid reservoir (not shown) and directed to the point of use (not shown) in the direction of arrows 26.

In accordance with this invention, the gaps and position of narrow passageways between the movable disc element and disc seat or seat cage for the disc element is controlled to reduce back pressure on the movable disc element.

Figure 2:
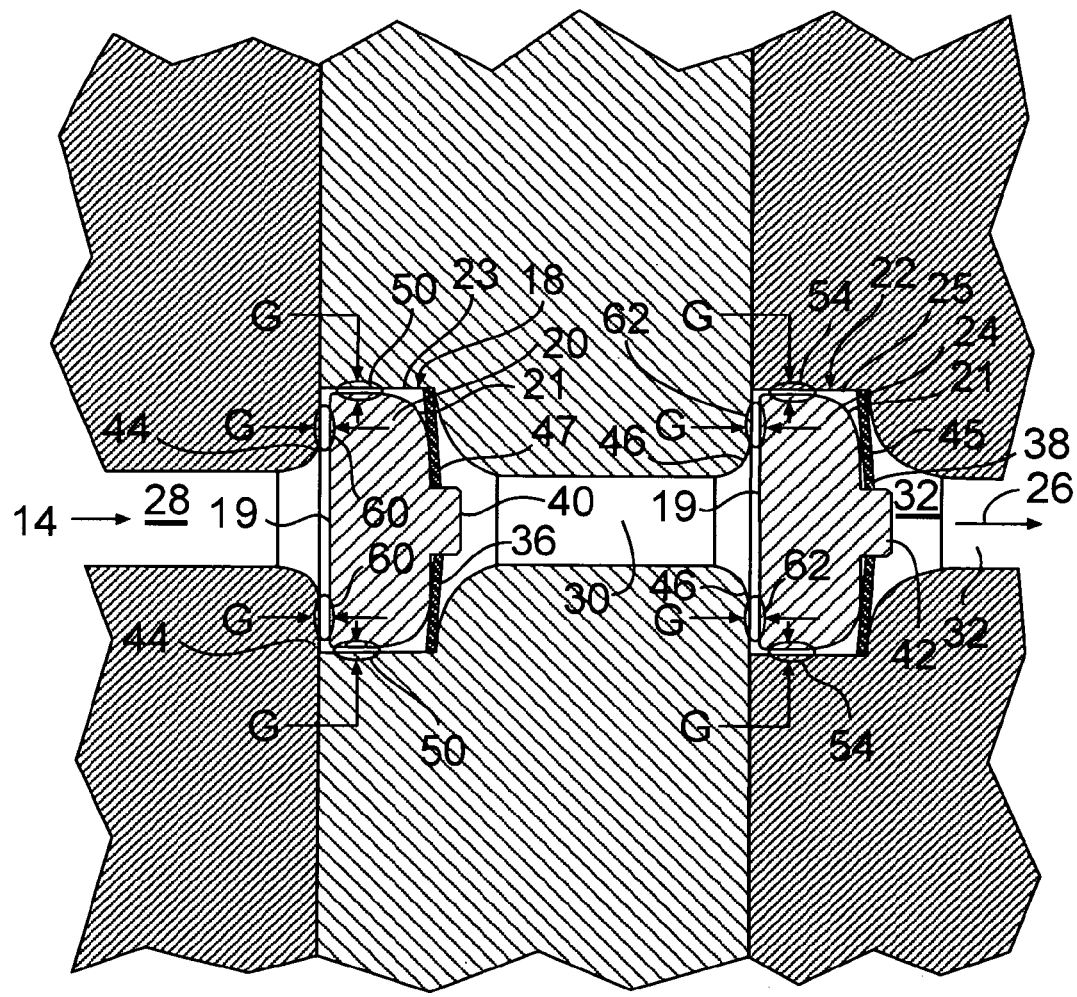
FIG. 2 is a close up view of the fluid delivery system of FIG. 1 showing the gaps that permit fluid flow.

Referring to FIG. 2 the gaps (G) which provide the desired back pressure during use are shown gaps (G) are positioned at the sealing band between the flat surface of the discs 20 and 24 and disc seats 44 and 46 and the intersection of the flat surface 19 and convex surface 21 of each disc 20 and 24. The narrow gaps (G) formed when the disc valves 18 and 22 are open are controlled by the retainer spring 36 for disc 20 and retainer spring 38 for disc 24. The retainer springs 36 and 38 retain the discs 20 and 24 by housing and confining the raised element 40 of disc 20 and raised element 42 of disc 24 so that the discs 20 and 24 remain in a centered position within disc cages 23 and 25. When the discs 20 and 24 are positioned on disc seats 44 and 46 in a closed position, the gaps (G) 60 and 62 are closed. The gaps 50 and 54 always stay open. The closed or open state of the gaps (G) 60 and 62 are controlled by retainer springs 36 and 38 as well as the fluid pressure on the discs 20 and 24. The gaps (G), 50 and 54 are maintained between about 0.005 inch and about 0.010 inch, preferably between about 0.0005 inch and about 0.005 inch and, most preferably about 0.001 inch. When the disc valves are open, the gaps 60 and 62 are between about 0.0005 inch and about 0.010 inch, preferably between about 0.0005 inch and about 0.005 inch, and most preferably about 0.001 inch. These gaps are controlled by the spring constant of spring retainers 36 and 38 and the upstream fluid pressure on the discs 20 and 24 exerted by the pumps (not shown). By controlling the gaps (G) in this manner, the desired reduction of back pressure on discs 20 and 24 is achieved.

Figure 3:
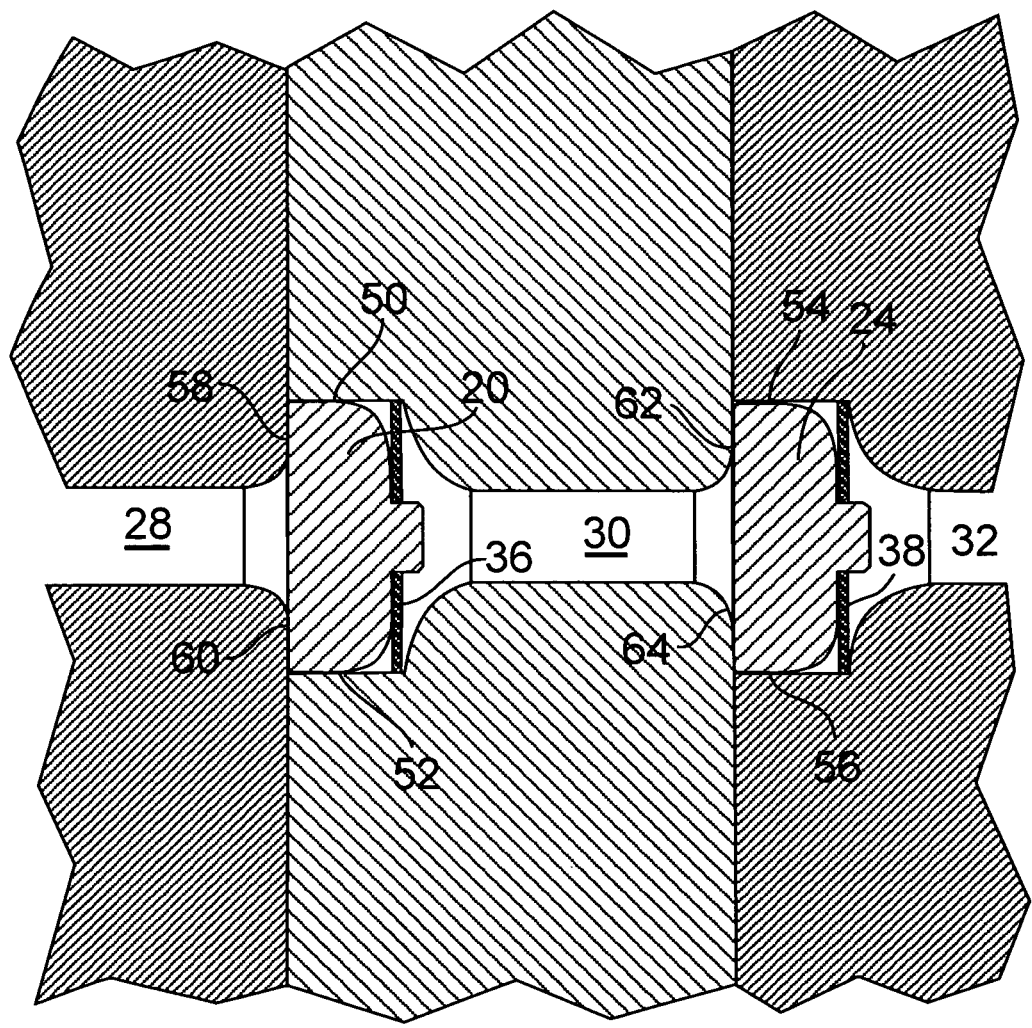
FIG. 3 is a cross section of a fluid delivery system of the system of FIG. 1 in a closed position.

Referring to FIG. 3, the discs 20 and 24 are shown in the closed position so that only gaps (G) 50 and 54 are open. When the disc valves 18 and 22 are closed, gaps (G) 60 and 62 are closed.

The gaps (G) 60 and 62, when the disc valves 18 and 22 are in the full open position are defined by the following equation:

$$G^3 = \frac{12\mu WQ}{\pi D \Delta P}$$

Where:
G: the gap of most narrow passageway between the flat surface of the disc and disc seat;

μ: dynamic viscosity of the fluid;
D: mean diameter of the flat sealing surface of the disc;
Q: desired fluid flow rate;
W: breadth of the flat sealing surface of the disc;
ΔP: pressure differential across the gap (G)

Figure 4:
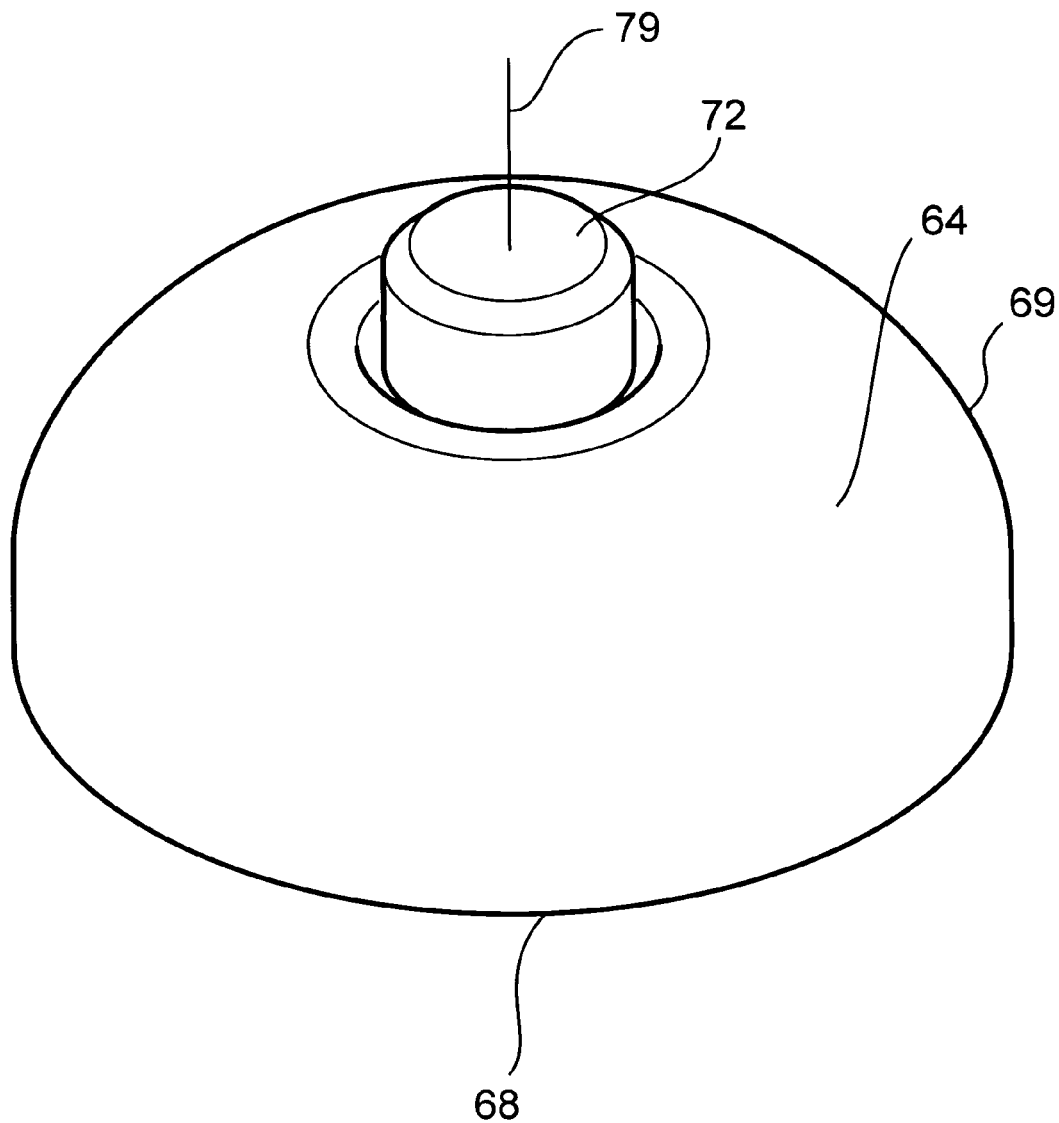
FIG. 4 is an isometric view of the movable disc of the valve of this invention.
Figure 5:
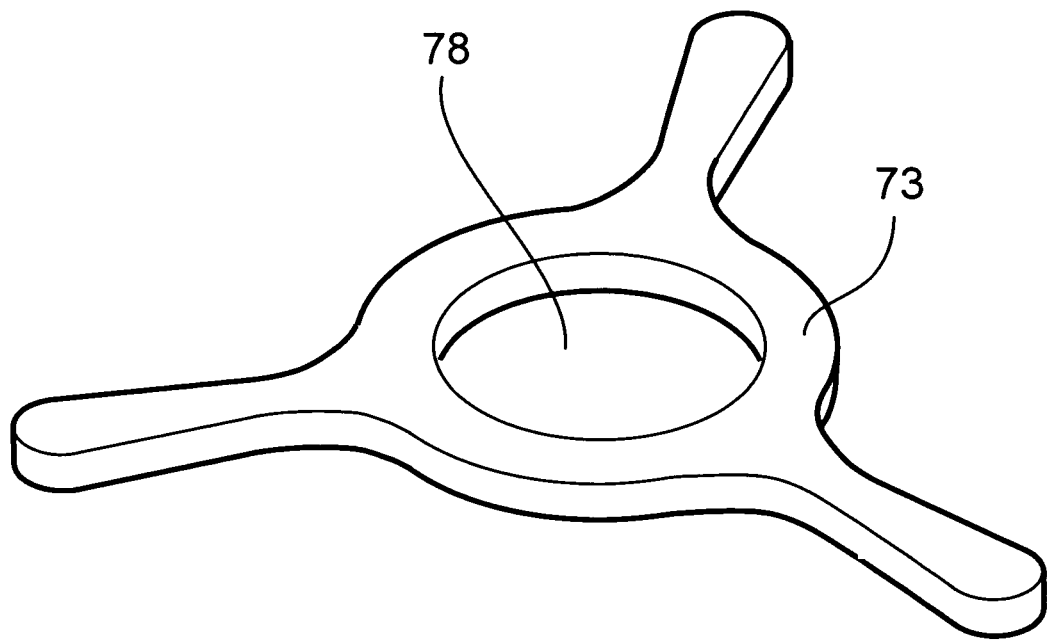
FIG. 5 is an isometric view of the spring retainer for controlling the position of the disc within the disc chamber.

Referring to FIGS. 4 and 5, a check valve of this invention is shown which includes a movable disc 64 having a flat sealing surface 68 and a leading convex surface 69 that intersects the flat surface 68 about the periphery of the convex surface 69. A raised element 72 of each disc 64 is provided which fits into opening 78 of spring 73 (FIG. 5). Spring 73 comprises the springs 36 and 38 of FIGS. 1, 2 and 3. The raised element 72 is confined by opening 78 so that the disc 64 remains centered within opening 78 about central axis 79 of disc 64.

The invention claimed is:

1. A check valve construction which comprises:
a movable disc having a convex surface and a planar, circular base,
a flat surface forming said base, and
a raised element on said convex surface,
a spring comprising an aperture sized to fit the spring over said raised element and to contact said convex surface at the base of said raised element;
a cage for said disc, said cage comprising:
a first seat for the flat surface of said disc and forming a fluid inlet,
a second seat for said spring and forming a fluid outlet, and
an annular surface connecting the first seat to the second seat; and defining a fluid path between said disc and said annular surface of the cage;
wherein said spring is effective to orient the disc within the cage and to bias the disc toward the flat surface; and to allow the disc to move away from the first seat in response to a pressure differential thereby creating a gap between the first seat and the flat surface and creating a fluid path from said fluid inlet, around the disc and to said fluid outlet;
including a narrowest portion of the fluid path defined by the equation:

$$G^3 = \frac{12\mu W Q}{\pi D \Delta P}$$

Wherein
G: the gap of most narrow passageway between the flat surface of the disc and disc seat;
μ: dynamic viscosity of the fluid;
D: mean diameter of the flat sealing surface of the disc;
Q: desired fluid flow rate;
W: breadth of the flat sealing surface of the disc;
ΔP: pressure differential across the gap (G).

2. The check valve construction of claim 1 wherein the gap is between about 0.0005 inch and about 0.010 inch.

3. The check valve construction of claim 1 wherein the gap is between about 0.005 inch and about 0.010 inch.

4. The check valve construction of claim 1 wherein the gap is about 0.001 inch.

5. A fluid delivery system including two check valve constructions of claim 1 connected in series, a fluid delivery channel into said check valves and a fluid delivery channel out of said check valves.

6. A fluid delivery system including two check valve constructions of claim 2, connected in series, a fluid delivery channel into said check valves and a fluid delivery channel out of said check valves.

7. A fluid delivery system including two check valve constructions of claim 3, connected in series, a fluid delivery channel into said check valves and a fluid delivery channel out of said check valves.

8. A fluid delivery system including two check valve constructions of claim 4, connected in series, a fluid delivery channel into said check valves and a fluid delivery channel out of said check valves.

* * * * *